April 21, 1925.  
E. C. COOLEY  
CAM FORMING MACHINE  
Filed Nov. 13, 1922

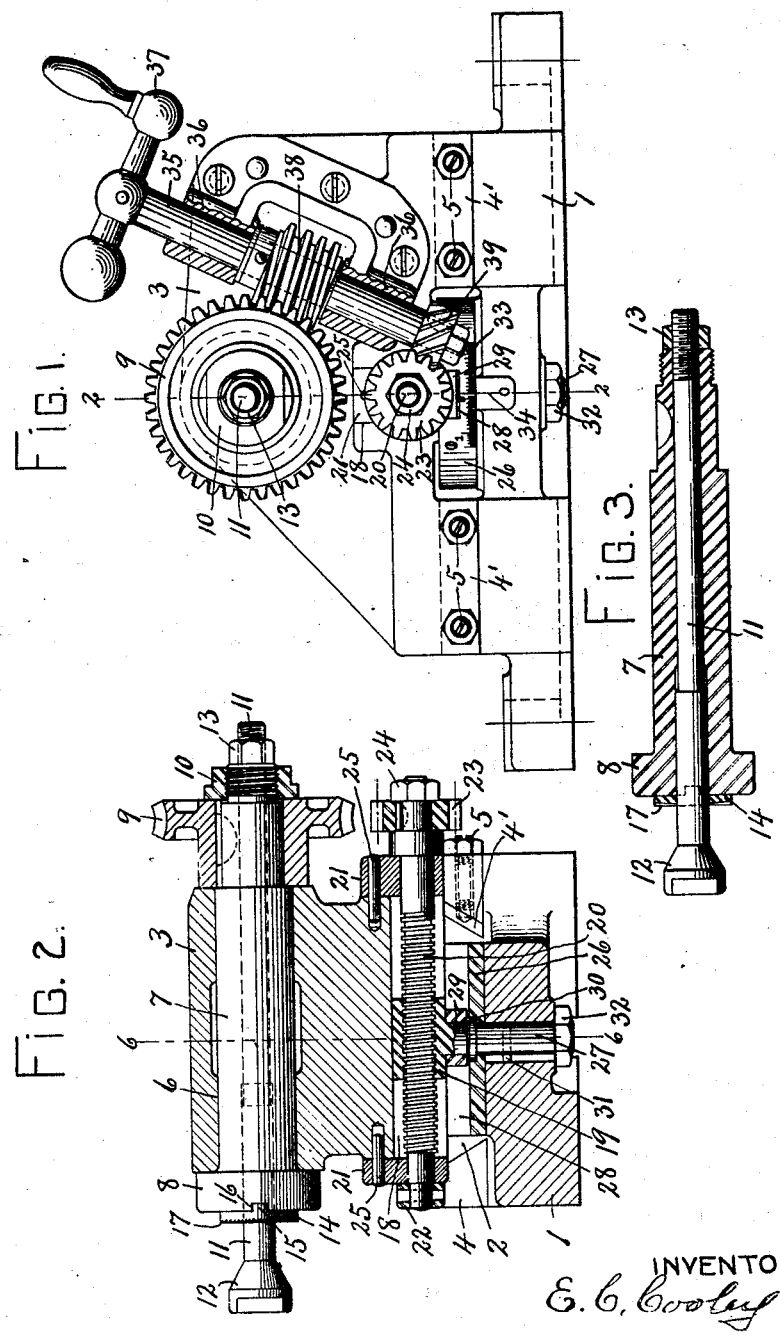

INVENTOR
E. C. Cooley
BY
Howard P. Denison
ATTORNEY

Patented Apr. 21, 1925.

1,534,632

UNITED STATES PATENT OFFICE.

ELMER C. COOLEY, OF EASTWOOD, NEW YORK.

CAM-FORMING MACHINE.

Application filed November 13, 1922. Serial No. 600,632.

*To all whom it may concern:*

Be it known that I, ELMER C. COOLEY, a citizen of the United States, and resident of Eastwood, in the county of Onondaga, in the State of New York, have invented new and useful Improvements in Cam-Forming Machines, of which the following, taken in connection with the accompanying drawings, is a full, clear, and exact description.

This invention relates to a cam forming machine in which the blank from which the cam is to be formed is clamped to a rotary work holder and the latter gradually moved radially toward or from the axis of the cutter as the work holder is rotated.

The main object is to provide simple and efficient means adjustable at will whereby the radial movement of the work holder may be synchronized with the rotary movement thereof and its relative speed of radial movement, as compared with the speed of rotary movement, varied to produce cams of different throw.

In other words, I have sought to effect this radial movement of the work holder relatively to the cutter through the medium of a screw operated nut which is slidable along separate ways one of which is adjustable at will to different angles relatively to the other to cause the blank to be cut to the desired contour or throw as the work holder and screw are simultaneously rotated.

Other objects and uses relating to specific parts of the device will be brought out in the following description.

In the drawings:

Figure 1 is a front elevation of a cam forming machine embodying the various features of my invention.

Figure 2 is a longitudinal vertical sectional view taken on line 2—2, Figure 1.

Figure 3 is a longitudinal sectional view of the detached rotary work holder.

The cam forming machine as illustrated, comprises a supporting base —1— having on its upper side a lengthwise guide way —2— of dove-tailed cross section along and upon which is movable a carriage —3— having its lower side provided with dove-tailed ribs —4— and —4'— for engaging opposite sides of the guide way —2—, one of said guide ribs being adjustable by means of screws —5— to take up wear.

The upper portion of the carriage is provided with a lengthwise bearing —6— in which is journaled a rotary sleeve —7— having one end enlarged at —8— to engage the adjacent end of the bearing —6— for holding the sleeve against endwise movement in one direction, the opposite end of said sleeve being reduced for receiving a worm gear —9— which is keyed to said sleeve and engages the opposite end of the bearing —6— to hold the sleeve against endwise movement in the opposite direction.

The reduced end of the sleeve —7— extends beyond the gear —9— and is threaded and engaged by a nut —10— for holding the gear against endwise displacement.

A clamping bolt —11— is extended centrally through the sleeve —7— some distance beyond the opposite ends thereof, and has one end adjacent the head —8— of the sleeve provided with a conical enlargement —12— while its other end is threaded and engaged by a nut —13— for drawing the bolt endwise.

Figure 5:
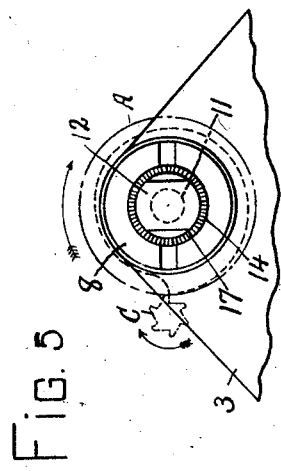
Figure 5 is an end view of the parts shown in Figure 4.
Figure 7:
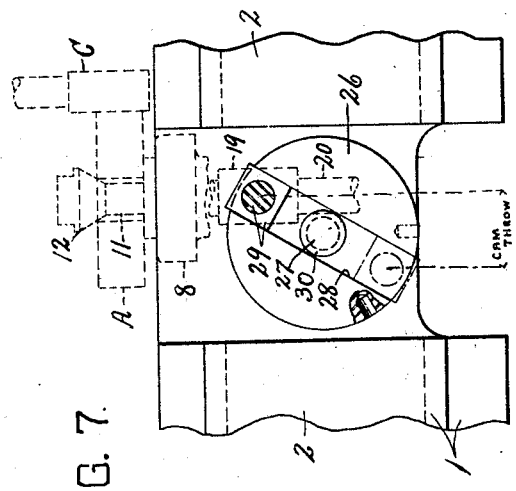
Figure 7 is a top plan of the central portion of the carriage supporting base and the rotary adjustable turret and adjacent portion of the slide which is movable in guide ways in the turret and carriage, portions of the slide and turret being shown in section while other portions of the slide and its actuating screw and portions of the work holder and cutter are shown by dotted lines.
Figure 4:
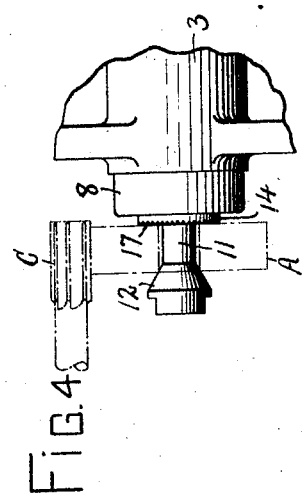
Figure 4 is a top plan of one end of the carriage and adjacent end of the work holder showing by dotted lines the blank from which the cam is to be formed and the adjacent end of a rotary cutter.

A disk —14— is loosely mounted upon the bolt —11— between the conical enlargement —12— and head —8— of the sleeve —7— and is provided with radial ribs —15— engaging in notches —16— in the adjacent end face of the sleeve for holding the disk against turning movement relatively to the sleeve, the outer end face of the sleeve being serrated at —17— for frictional engagement with the adjacent end of the cam blank or work as A which is also engaged by the conical enlargement —12— when the bolt is tightened to clamp the work to the sleeve and permit it to be rotated against a suitable rotary cutter C shown by dotted lines in Figures 4, 5, and 7.

The sleeve —7—, clamping bolt —11— and disk —14— constitute the work holder and although the bolt —11— is passed loosely through a central opening in the sleeve —7— for relative endwise movement it serves to firmly clamp the work between the conical head —12— and disk —14— when tightened and is thereby caused to rotate with the sleeve and disk to carry the work against the rotary cutter C for cutting the blank A to the desired cam form, it being understood that the cutter C extends parallel with the axis of the sleeve —7— at one side thereof and that the carriage is adjustable along the guide way —2— at right angles to said axis to conform to blanks of different diameters and also to effect the cutting of the blank to the desired cam form as will be hereinafter more fully explained.

The lower side of the carriage —3— is provided with a lengthwise groove or guideway —18— parallel with the axis of the work holder for receiving a sliding member or nut —19— and a screw shaft —20— which is journaled in suitable bearings —21— on opposite sides of the carriage —3— or at opposite ends of the guide way —18— so that the screw portion of the shaft may extend approximately the full length of the groove or guide way parallel with the axis of the work holder.

The end of the screw shaft —20— adjacent the work is reduced and provided with a collar —22— secured thereto and engaging the outer face of the adjacent bearing —21— to hold the screw shaft against endwise movement in one direction, the other end of the screw shaft being provided with a gear —23— secured thereon by a nut —24— and engaging the outer face of the adjacent bearing —21— to hold the screw shaft against endwise movement in the opposite direction.

For convenience of assembling, the bearings —21— are removably mounted upon the opposite ends of the carriage —3— and are held against rotation by pins —25— entering corresponding sockets in the adjacent ends of the carriage as shown in Figure 2.

The central portion of the guide way —2— is preferably cut away to form a recess in the upper side of the base —1— below the open lower side of the groove or guide way —18— for receiving a circular turret —26— which is adjustable rotarily about the axis of a vertical coaxial clamping bolt —27— and is provided in its upper side with a diametrically extending groove or guide way —28— for receiving an extension —29— of the sliding member or nut —19— which is engaged in and operated lengthwise of the grooves or guide ways —18— and —28— by the screw shaft —20— as the latter is rotated in one direction or the other.

The upper end of the clamping bolt —27— is enlarged at —30— and engaged in a corresponding socket in the turret —26— below the groove or guide way —28— said bolt being splined by a pin —31— in its opening in the base plate —1— to move axially and has its lower end threaded and engaged by a nut —32— which in turn engages the lower face of the base —1— for tightening and releasing the turret —26—.

As previously stated the turret —26— is adjustable rotarily which permits its groove or guide way —28— to be adjusted into parallelism with or at different angles relatively to the guide way —18— and axes of the screw shaft —20— and work holder.

The turret —26— is provided with peripheral graduations —33— extending in opposite directions from a zero position for registration with a fixed index —34— on the adjacent portion of the base —1— to indicate the amount of throw which it is desired to impart to the cam by simply adjusting the turret to the desired angle, the turret being in its neutral position with its groove or guide way —28— parallel with the axis of the work holder when the zero graduation is registered with the fixed mark —34—.

A drive shaft —35— is journaled in suitable bearings —36— on the carriage —3— to be operated by a handle —37— or other suitable operating means and is provided with a worm —38— and a gear —39— meshing respectively with the worm gear —9— and the gear —23— for simultaneously or synchronously rotating the work holder —7— and screw shaft —20—.

The axis of rotation of the turret —26— is disposed in the vertical plane of the axis of the work holder —7— and screw shaft —20— and is therefore radial to those parts while the guide groove —28— is diametrical and permits the nut —19— to slide therein the entire length thereof.

Figure 6:
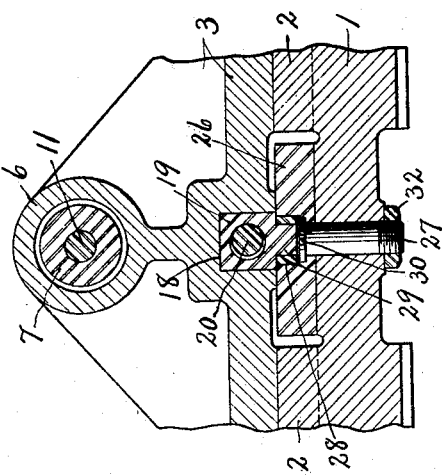
Figure 6 is a transverse vertical sectional view taken in the plane of line 6—6, Figure 2.

In Figures 1, 2 and 6, the turret is shown as adjusted to its neutral or zero position with its guide groove —28— parallel and coincident with the guide groove —18— while the nut or sliding member —19— is shown in its middle position or directly over the axis of the turret and therefore it follows that any movement of the nut by the rotation of the screw would not effect the position of the carriage or work holder relatively to the cutter.

On the other hand in Figure 7, the turret is shown as adjusted rotarily a definite amount to bring its guide groove —28— at a pre-determined angle relatively to the guide groove —18— and axes of the screw shaft —20— and sleeve —7— of the work holder under which conditions it is evident that if the nut —19— is moved endwise by the rotation of the screw —20—, the movement of the extension —29— of the nut in the guide groove —28— will impart a certain amount of movement to the carriage —3— along the ways —2— and therefore, transversely of or radial to the axes of the screw shaft —20— and sleeve —7— of the work holder, the amount of said transverse movement for a given movement of the nut being proportionate to the angle at which the guide groove —28— is adjusted in either direction from its zero position.

The ratios of the gears —8— and —38—, and —23— and —39— and also the pitch of the screw —20— are made to cause the nut —19— to travel approximately the entire length of the guide groove —28— at each revolution of the work holder so that in cutting the blank A to the desired form or cam throw, the nut —19— is first adjusted to one end of the groove —28— while the cutter C will be adjusted by any suitable means to bring its cutting edge into engagement with the periphery of the blank, whereupon by rotating the shaft —35— through the medium of its handle —37— will cause the nut —19— to travel along the diagonally disposed guide groove —28— and thereby produce a corresponding movement of the carriage —3— along its ways —2— for gradually feeding the work against the cutter during one revolution which under ordinary conditions is sufficient to generate the desired cam surface.

It is evident, however, that if the cut is too deep to be made by the cutter through one revolution of the work holder the cutter may be set up a trifle at the end of each revolution and the direction of motion of the nut —19— reversed by simply reversing the direction of rotation of the drive shaft —35—.

The operation of my invention will now be readily understood upon reference to the foregoing description and the accompanying drawing, but it is evident that certain changes may be made in the detail construction and operation without departing from the spirit of this invention and therefore, I do not wish to limit myself to the precise construction shown and described.

I claim:

1. A cam forming machine comprising, in combination with a cutter, a support having a guideway, a carriage movable along the guideway, a rotary work-holder journaled on the carriage transversely of the guideway, a guide member adjustable on the support to different angles relatively to the axis of the work holder, a slide movable on the carriage parallel with said axis and in sliding engagement with said guide member, means for rotating the work-holder, and means for moving the slide as the work-holder is rotated.

2. A cam forming machine comprising in combination with a cutter, relatively movable elements having guide ways one of which is adjustable to different angles relatively to the other, a slide movable along both guide ways to cause a relative movement of said elements, and a rotary work holder mounted on one of said elements.

3. A cam forming machine comprising in combination, with a cutter, a rotary work-holder, a carriage for the work-holder movable transversely of the axis thereof and provided with a guideway parallel with said axis, an additional guide way adapted to be set at an angle to the first named guideway and a slide movable in both guideways.

4. A cam forming machine comprising, in combination with a cutter, a rotary work-holder, a carriage for the work-holder, a guideway for the carriage at right angles to the axis of the work-holder, a guideway on the carriage parallel with said axis, an adjustable guide way movable to different angles relatively to the first and second named guideways, a slide movable in the second and third named guideways, means including a drive-shaft for rotating the work holder, and means actuated by the drive-shaft for moving the slide.

5. A cam forming machine comprising in combination with a rotary cutter, a rotary work-holder parallel with the axis of the cutter, a carriage for the work-holder, a guideway parallel with said axis, a guideway for the carriage at a right angle to said axis, a turret having a guideway adjustable to different angles relatively to the first and second named guideways, means for holding the turret in its adjusted position, a nut slidable in the first and third named guideways, a screw for operating said nut, a drive shaft on the carriage, means for transmitting motion from the drive shaft to the work-holder, and means for transmitting motion from the drive shaft to the screw.

In witness whereof I have hereunto set my hand this 4th day of November 1922.

ELMER C. COOLEY.

Witnesses:
H. E. CHASE,
RITA CAMPOLIETO.